(No Model.)

J. J. LLOYD.
CAR COUPLING.

No. 293,757. Patented Feb. 19, 1884.

WITNESSES:
Deemer & Deemer
C. Sedgwick

INVENTOR:
J. J. Lloyd
BY Munn & Co
ATTORNEYS.

UNITED STATES PATENT OFFICE.

JOHN J. LLOYD, OF STREATOR, ILLINOIS.

CAR-COUPLING.

SPECIFICATION forming part of Letters Patent No. 293,757, dated February 19, 1884.

Application filed May 22, 1883. (No model.)

*To all whom it may concern:*

Be it known that I, JOHN J. LLOYD, of Streator, in the county of La Salle and State of Illinois, have invented a new and Improved Car-Coupler and Draw-Bar, of which the following is a full, clear, and exact description.

The object of the invention is to make certain improvements in a car-coupling, as hereinafter described and claimed.

Reference is to be had to the accompanying drawings, forming part of this specification, in which similar letters of reference indicate corresponding parts in all the figures.

Figure 1:
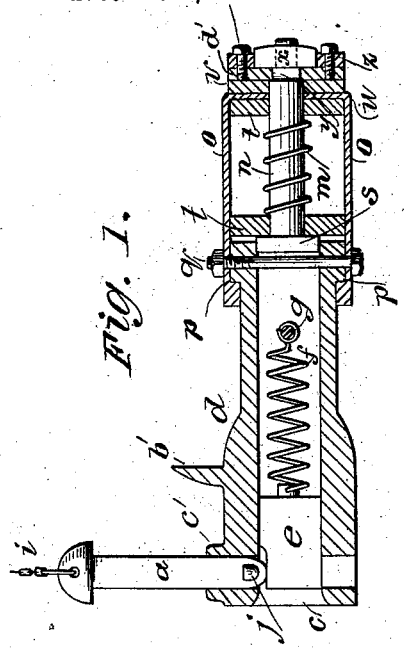
Figure 3:
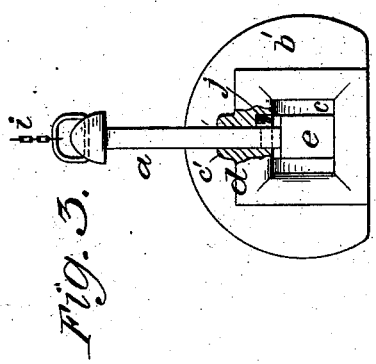
Figure 2:
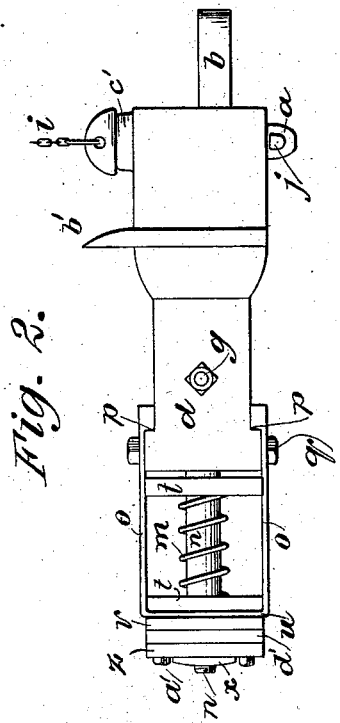
Figure 4:
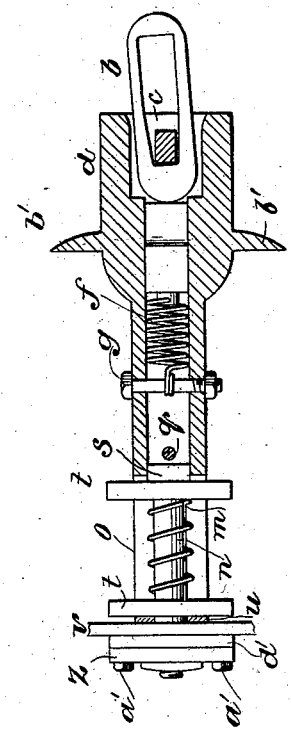

Figure 1 is a longitudinal sectional elevation of a draw-bar and coupling device contrived according to my invention. Fig. 2 is a side elevation of the same. Fig. 3 is an end elevation with a part broken out; and Fig. 4 is a horizontal section of the draw-bar.

For setting the coupling-pin $a$ so that it will be tripped and let fall by the link $b$, when the cars run together and the link enters the link-socket $c$ of the draw-bar $d$, I arrange a sliding block, $e$, in the link-socket $c$, with a spiral spring, $f$, behind said block, and bearing against a bolt, $g$, crossing the socket and supporting the spring, so that whenever the coupling-pin $a$ is raised the block will thrust forward under the coupling-pin to hold it up, as represented in Figs. 1 and 3; and with this sliding block I provide the coupling-pin $a$ with a chain, $i$, extending up to the top of a freight-car, for pulling up the pin, the chain being suitably fastened to the top of the car, with sufficient slack to allow the pin to drop through the link; and to the lower end of the pin I attach a short stud-pin, $j$, to serve for a stop to prevent the pin being pulled up out of the draw-bar, said pin being attached, by means of a short shank, partly square, inserted in a hole through the pin from side to side, after the pin $a$ has been passed through the upper side of the draw-head and riveted or headed down on the other side. The square form for a portion of the shank is to prevent the stop-pin from turning, in order that the curved lower corner, which is made to facilitate the dropping of the pin through the link, shall not shift out of place. In connection with this stop stud or pin $j$, I make a little recess in the upper wall of the link-socket, to allow the pin to rise high enough for the block $e$ to slide under the pin. In connection with a coupling-pin thus provided with a stop-stud to prevent it from being pulled out of the pin-hole of the draw-head, I make the link $b$ wider at that end through which such pin is to drop than at the other end, as clearly shown in Fig. 4, tapering the inner sides of the link to the width of the pin at the other end, which, together with a suitably-curved form of the end of the link, allows the link to be shifted laterally at the outer end either way, to set it for self-coupling on curves. The link may be connected with the draw-head in which it is to be set for self-coupling by any ordinary pin not having the lifting-chain $i$ and the stop-stud $j$.

For the application of the buffer-spring $m$ and the connecting-bolt $n$, I attach a strong but flat bar, $o$, by shoulders $p$ and a fastening-bolt, $q$, which also passes through the rear end of the draw-bar $d$ in front of the head $s$ of bolt $n$, the spring $m$ being confined between the strong washers $t$ at the head and at the back end, $u$, of the bar $o$, respectively, to resist the pull on the bolt, which also extends to slide backward through the bar $v$, which is attached to the car-body. The bolt $n$ is held behind bar $v$ by the nut $x$, the shank of the bolt being square at $y$, where it passes through the plate $d'$, applied on the bolt $n$ next the bar $v$, to prevent the bolt from turning when it is forced back when coupling or backing the cars, a nut-locking plate, $z$, apertured to fit over or around the nut, being bolted to plate $d'$, to move back with said plate.

To prevent the draw-bar from being forced back too far, it is made with a collar or flange, $b'$, which forms a stop against the timbers of the car-body in which the draw-bar is arranged, and the draw-bar is cast with an extension, $c'$, upward around the hole for pin $a$, to afford plenty of bearing-support to keep the pin upright.

Having thus described my invention, I claim as new and desire to secure by Letters Patent—

1. The combination, in a car-coupling, of the draw-bar $d$, yoke-bar $o$, draw-bolt $n$, buffer-spring $m$, and washers $t$, the yoke being connected to the draw-bar by the shoulders $p$ and bolt $q$, and the bolt $n$ being extended through the bar $v$ and secured by nut $x$, substantially as described.

2. The draw-bolt connected to the plate $d'$ by a square shank, $y$, and secured by the nut $x$, having a lock-plate, $z$, held to the plate $d'$, and also fastened to it with a screw or screws, substantially as described.

3. The link $b$, having a slot increasing in width from the rear to the front end thereof, to adapt it for self-coupling on a curved track.

4. The combination, with the draw-bar, buffer-spring, and bolt $n$, of the flat bent bar $o$, connected by shoulders $p$ with said draw-bar, the fastening-bolt $q$, passing through the rear end of draw-bar in front of the head of bolt $n$, and the washers $t\ t$, arranged at the head and back end of said bar; whereby the buffer-spring and bolt are secured, as described.

JOHN J. LLOYD.

Attest:
H. A. STARK,
W. H. PILCHER.